United States Patent
Li et al.

(10) Patent No.: US 9,807,801 B2
(45) Date of Patent: *Oct. 31, 2017

(54) DEVICE AND METHOD FOR TRANSMITTING RANDOM ACCESS PREAMBLE

(71) Applicant: Samsung Electronics Co., Ltd., Suwon-si, Gyeonggi-do (KR)

(72) Inventors: Yingyang Li, Beijing (CN); Yujian Zhang, Beijing (CN); Xiaoqiang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

This patent is subject to a terminal disclaimer.

(21) Appl. No.: 14/539,393

(22) Filed: Nov. 12, 2014

(65) Prior Publication Data

US 2015/0071134 A1 Mar. 12, 2015

Related U.S. Application Data

(63) Continuation of application No. 14/459,798, filed on Aug. 14, 2014, which is a continuation of application
(Continued)

(30) Foreign Application Priority Data

Jan. 7, 2008 (CN) .......................... 2008 1 0002414

(51) Int. Cl.
*H04W 74/08* (2009.01)
*H04W 72/04* (2009.01)
(Continued)

(52) U.S. Cl.
CPC ....... *H04W 74/0833* (2013.01); *H04J 11/005* (2013.01); *H04L 5/0005* (2013.01);
(Continued)

(58) Field of Classification Search
CPC ............ H04J 11/005; H04J 2011/0096; H04L 5/0005; H04L 5/0007; H04L 5/001;
(Continued)

(56) References Cited

U.S. PATENT DOCUMENTS

2002/0089957 A1* 7/2002 Viero .................. H04W 74/006
370/336
2005/0271000 A1* 12/2005 Schulist ............... H04B 1/7115
370/328
(Continued)

FOREIGN PATENT DOCUMENTS

CN WO 2007082458 A1 * 7/2007 ........... H04L 5/0007
CN 101043256 A 9/2007
(Continued)

OTHER PUBLICATIONS

Pauli et. al, "Overview of LTE TDD", Nomor 3GPP Newsletter, Nov. 2007.*
(Continued)

*Primary Examiner* — Khoa Huynh
(74) *Attorney, Agent, or Firm* — Jefferson IP Law, LLP

(57) ABSTRACT

Base Station (BS) and User Equipment (UE) apparatuses for configuring a Random Access CHannel (RACH), and methods thereof, are provided. The method for a BS to configure a RACH includes generating configuration information on RACH resources, transmitting the configuration information on the RACH resources to a UE, receiving a random access preamble multiplexed on a plurality of continuous RACH resources from the UE, extracting the random access preamble multiplexed on the plurality of continuous RACH resources, and detecting the extracted random access preamble. The method for a UE to configure a RACH includes receiving configuration information on RACH resources from a BS, selecting occupied RACH resources among a plurality of continuous RACH resources, generating a ran-
(Continued)

dom access preamble, multiplexing the generated random access preamble on the selected RACH resources, and transmitting the random access preamble on the selected RACH resources to the BS.

22 Claims, 7 Drawing Sheets

Related U.S. Application Data

No. 12/811,933, filed as application No. PCT/KR2009/000051 on Jan. 7, 2009, now Pat. No. 8,811,305.

(51) Int. Cl.

| | | |
|---|---|---|
| *H04W 74/00* | (2009.01) | |
| *H04L 5/00* | (2006.01) | |
| *H04L 5/14* | (2006.01) | |
| *H04J 11/00* | (2006.01) | |
| *H04W 72/02* | (2009.01) | |
| *H04W 88/08* | (2009.01) | |

(52) U.S. Cl.
CPC ............ *H04L 5/0048* (2013.01); *H04L 5/14* (2013.01); *H04W 72/02* (2013.01); *H04W 72/044* (2013.01); *H04W 72/0413* (2013.01); *H04W 72/0446* (2013.01); *H04W 74/004* (2013.01); *H04W 74/006* (2013.01); *H04W 72/0493* (2013.01); *H04W 88/08* (2013.01)

(58) Field of Classification Search
CPC ..... H04L 5/0048; H04L 5/005; H04L 5/0051; H04L 5/0057; H04L 5/0067; H04L 5/14; H04W 72/02; H04W 72/04; H04W 72/0413; H04W 72/044; H04W 72/0446; H04W 72/0453; H04W 72/0493; H04W 74/004; H04W 74/006; H04W 74/0833; H04W 88/08

See application file for complete search history.

(56) References Cited

U.S. PATENT DOCUMENTS

| | | |
|---|---|---|
| 2007/0064665 A1 | 3/2007 | Zhang et al. |
| 2007/0171889 A1 | 7/2007 | Kwon et al. |
| 2007/0206531 A1 | 9/2007 | Pajukoski et al. |
| 2007/0263579 A1 | 11/2007 | Ozluturk |
| 2007/0291696 A1 | 12/2007 | Zhang et al. |
| 2009/0088175 A1* | 4/2009 | Pelletier ............ H04W 74/0866 455/450 |
| 2009/0109908 A1 | 4/2009 | Bertrand et al. |
| 2009/0175159 A1 | 7/2009 | Bertrand et al. |
| 2009/0215450 A1* | 8/2009 | Baldemair ....... H04W 74/0891 455/434 |

FOREIGN PATENT DOCUMENTS

| | | |
|---|---|---|
| EP | 1811691 A2 | 7/2007 |
| EP | 2 239 989 A1 | 10/2010 |
| WO | 2007/045504 A1 | 4/2007 |

OTHER PUBLICATIONS

Panasonic, RACH Remaining Issues, 3GPP Draft; R1-074922, vol. RAN WG1, Korea, Oct. 30, 2007.
Motorola, RACH Frequency Hopping Pattern, 3GPP Draft, R1-074606, vol. RAN WG1, Korea, Oct. 30, 2007.
CMCC et al., Way Forward on LTE TDD Frame Struction, 3GPP Draft, R1-075020, vol. RAN WG1, Korea, Nov. 6, 2007.
Pauli et. al, "Overview of L TE TDD", Nomor 3GPP Newsletter, Nov. 2007.
NTT DoCoMo et. al, "SCH Structure and Cell Search Method in E-UTRA Downlink", 3GPP TSG-RAN WG1 L TE Ad Hoc Meeting, R1-060042, Jan. 23-25, 2006.

* cited by examiner

DEVICE AND METHOD FOR TRANSMITTING RANDOM ACCESS PREAMBLE

CROSS-REFERENCE TO RELATED APPLICATION(S)

This application is a continuation application of a prior application Ser. No. 14/459,798, filed on Aug. 14, 2014, and of a prior U.S. National Stage application Ser. No. 12/811,933, filed on Jul. 7, 2010, which claims the benefit under 35 U.S.C. §371 of an International application filed on Jan. 7, 2009 and assigned application number PCT/KR2009/000051, which claims the benefit of a Chinese patent application filed on Jan. 7, 2008 in the Chinese Intellectual Property Office and assigned Serial number 200810002414.2, the entire disclosure of each of which is hereby incorporated by reference.

BACKGROUND OF THE INVENTION

1. Field of the Invention

The present invention relates to a wireless communication system. More particularly, the present invention relates to a device and method for transmitting a random access preamble in a wireless communication system.

2. Description of the Related Art

Now, the 3rd Generation Mobile Communication System Partnership Project (3GPP) standardization organization has commenced on Long-term Evolution (LTE) to the existing system criteria. Among many physical layer transmission techniques, both a downlink transmission technique based on Orthogonal Frequency Division Multiplexing (OFDM) and an uplink transmission technique based on Single Carrier Frequency Division Multiple Addressing (SCFDMA) are actively being researched.

In the following description, a sampling frequency of 30.72 MHz is used as an example. In this case, when the interval between sub-carriers is 15 KHz, the number of valid OFDM samples is 2048 and the corresponding sample interval is $T_s=1/(15000\times2048)$. For other sampling frequencies, the corresponding number of valid OFDM samples and the number of Cyclic Prefix (CP) samples can be obtained in proportion to the sampling frequency.

There are two types of a frame structure in an LTE system, namely a Frame Structure Type 1 and a Frame Structure Type 2. In Frame Structure Type 1, a Frequency Division Duplex (FDD) mode is employed, and in a Frame Structure Type 2, a Time Division Duplex (TDD) mode is employed. Hereafter, the design of an LTE system implementing the Frame Structure Type 2 with a TDD mode is described.

FIG. 1 illustrates a frame structure of an LTE TDD system according to the related art.

Referring to FIG. 1, a radio frame with a length of $307200\times T_s=10$ ms for each radio frame is equally divided into two half-frames with a length of $153600\times T_s=5$ ms. Each half-frame contains eight slots with a length of $15360T_s=0.5$ ms and three special domains, i.e., the Downlink Pilot Time Slot (DwPTS), the Guard Period (GP) and the Uplink Pilot Time Slot (UpPTS). The total combined length of the three special domains is $30720T_s=1$ ms Each slot contains several OFDM symbols. There are two kinds of CP in OFDM symbols, namely a general CP and an extended CP. A slot with the general CP contains 7 OFDM symbols and a slot with the extended CP contains 6 OFDM symbols. In the application of general CP, the CP in the first OFDM symbol of the slot is $160\times T_s$ (about 5.21 µs) long, and the CPs in the remaining 6 OFDM symbols are $144\times T_s$ (4.69 µs) long. In the application of extended CP, the CP in each OFDM symbols of the slot is $512\times T_s(16.67$ µs) long. Two continuous slots compose a subframe. Subframe 1 and subframe 6 contain the three special domains. According to the present discussion, subframe 0, subframe 5 and the DwPTS are fixed for downlink transmission. Also, according to the present discussion, for the transition period of 5 ms, the UpPTS, subframe 2 and subframe 7 are fixed for uplink transmission. In addition, according to the present discussion, for the transition period of 10 ms, the UpPTS and subframe 2 are fixed for uplink transmission.

According to the present discussion on LTE TDD, the uplink data, the random access preamble and the channel Sensing Reference Signal (SRS) can be transmitted in the UpPTS.

FIG. 2 illustrates a structure of a random access preamble according to the related art.

Referring to FIG. 2, the random access preamble contains a circular prefix with a length of $T_{CP}$ and a sequence with a length of $T_{SEQ}$. Several structures of the preamble are defined in the table below:

TABLE 1

| Parameters for the random access preamble | | |
|---|---|---|
| The preamble format | $T_{CP}$ | $T_{SEQ}$ |
| 0 | $3152 \times T_s$ | $24576 \times T_s$ |
| 1 | $21012 \times T_s$ | $24576 \times T_s$ |
| 2 | $6224 \times T_s$ | $2 \times 24576 \times T_s$ |
| 3 | $21012 \times T_s$ | $2 \times 24576 \times T_s$ |
| 4 (only for the Frame Structure Type 2) | $0 \times T_s$ | $4096 \times T_s$ |

In Table 1, the preamble format 4 is only applied to an LTE TDD system, the sequence length $T_{SEQ}$ of which is $4096\times T_s$, which is equal to the time length of two uplink SCFDMA symbols. Here, the CP length $T_{CP}$, is 0, i.e., no CP is added in the preamble. The feature of such a format is that the random access preamble is short and generally transmitted by virtue of the UpPTS in an LTE TDD system. According to the present discussion, a Random Access CHannel (RACH) signal, which is in this format, is transmitted in the position $5120\times T_s$ prior to the end of UpPTS. Therefore, in the receiving end of a BS, the random access preamble is transmitted within the time segment with a length of $5120\times T_s$ prior to the end of UpPTS. Herein, a random access preamble transmitted through UpPTS is referred to as a short RACH.

According to the present discussion on LTE, the allocation of a frequency band for a Physical Uplink Control CHannel (PUCCH) is implemented at the two ends of the band so as to avoid a Physical Uplink Shared Data CHannel (PUSCH) being divided into multiple frequency bands by the PUCCH. The reason for this is that user equipments transmitting uplink data through multiple frequency bands with no frequency overlap will damage a single-carrier attribute, from which an increase of a Cube Metric (CM) results.

FIG. 3 schematically shows frequency locations of a RACH in an LTE FDD system according to the related art.

Referring to FIG. 3, in each RACH timing location, there are two possible frequencies located at the two ends of the system frequency band, which are adjacent to the PUCCH. This configuration is performed to avoid damaging the PUSCH's single-carrier attribute. According to the present discussion, in an LTE FDD system, only one RACH resource can be configured for one RACH's timing location. RACH's collision probability is controlled by configuring the RACH density in the time domain. In order to obtain the frequency diversity effect, the RACH implements frequency hopping between the two possible frequency locations illustrated in FIG. 3. For an LTE TDD system, it is possible to configure several RACH resources for one RACH timing location to counteract the limitation of an uplink downlink transition period.

It is a typical configuration that the UpPTS contains two SCFDMA symbols. In this case, the UpPTS can be adopted to transmit either the random access preamble in format 4 of Table 1 or the SRS. Suppose at least one RACH resource has been configured in the UpPTS. To guarantee that RACH resources are orthogonal to SRS resources, the SRS can only be transmitted through the rest of the frequency resources. Therefore, a need exists for a RACH configuration method, wherein not only the requirement of the format 4 for the random access preamble can be met, but also the transmission of SRS can be implemented effectively.

SUMMARY OF THE INVENTION

An aspect of the present invention is to address at least the above-mentioned problems and/or disadvantages and to provide at least the advantages described below. Accordingly, an aspect of the present invention is to provide a device and method for transmitting random access preamble in a wireless communication system.

In accordance with an aspect of the present invention, a method for a Base Station (BS) to configure a Random Access CHannel (RACH) is provided. The method includes generating configuration information on RACH resources, transmitting the configuration information on the RACH resources to a User Equipment (UE), receiving a random access preamble multiplexed on a plurality of continuous RACH resources from the UE, extracting the random access preamble multiplexed on the plurality of continuous RACH resources, and detecting the extracted random access preamble.

In accordance with another aspect of the present invention, a method for UE to configure a RACH is provided. The method includes receiving configuration information on RACH resources from a BS, selecting occupied RACH resources among a plurality of continuous RACH resources, generating a random access preamble, multiplexing the generated random access preamble on the selected RACH resources, and transmitting the random access preamble on the selected RACH resources to the BS.

In accordance with yet another aspect of the present invention, a BS apparatus for configuring a RACH is provided. The apparatus includes broadcast information generator for generating configuration information on RACH resources, a transmitter for transmitting the configuration information on the RACH resources to a UE, a receiver for receiving a random access preamble multiplexed on a plurality of continuous RACH resources from the UE, physical channel de-multiplexor for extracting the random access preamble multiplexed on the plurality of continuous RACH resources, and a random access preamble for detecting the extracted random access preamble.

In accordance with still another aspect of the present invention, an UE apparatus for configuring a RACH is provided. The apparatus includes a receiver for receiving configuration information on RACH resources from a BS, a broadcast information interpreter for selecting occupied RACH resources among a plurality of continuous RACH resources, a random access preamble generator for generating a random access preamble, a physical channel multiplexor for multiplexing the generated random access preamble on the selected RACH resources, and a transmitter for transmitting the random access preamble on the selected RACH resources to the BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
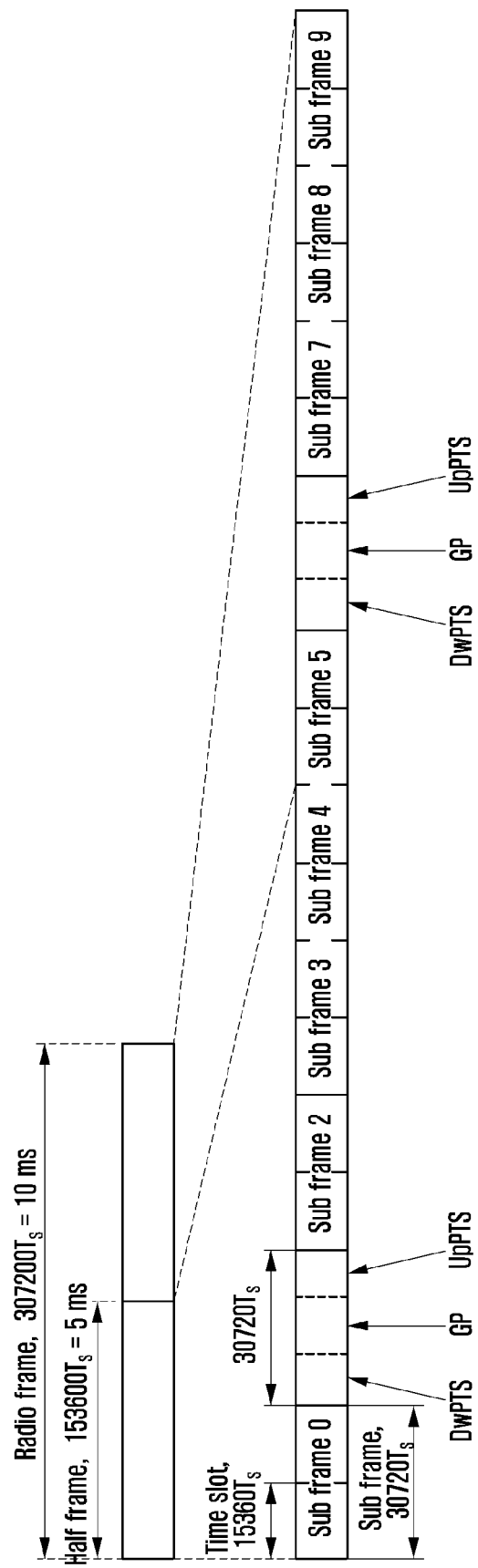
FIG. 1 shows a Long-term Evolution (LTE) Time Division Duplex (TDD) frame structure according to the related art.
Figure 2:
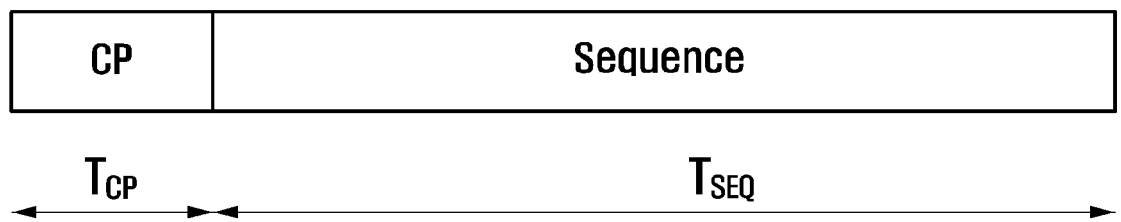
FIG. 2 shows a structure of a random access preamble according to the related art.
Figure 3:
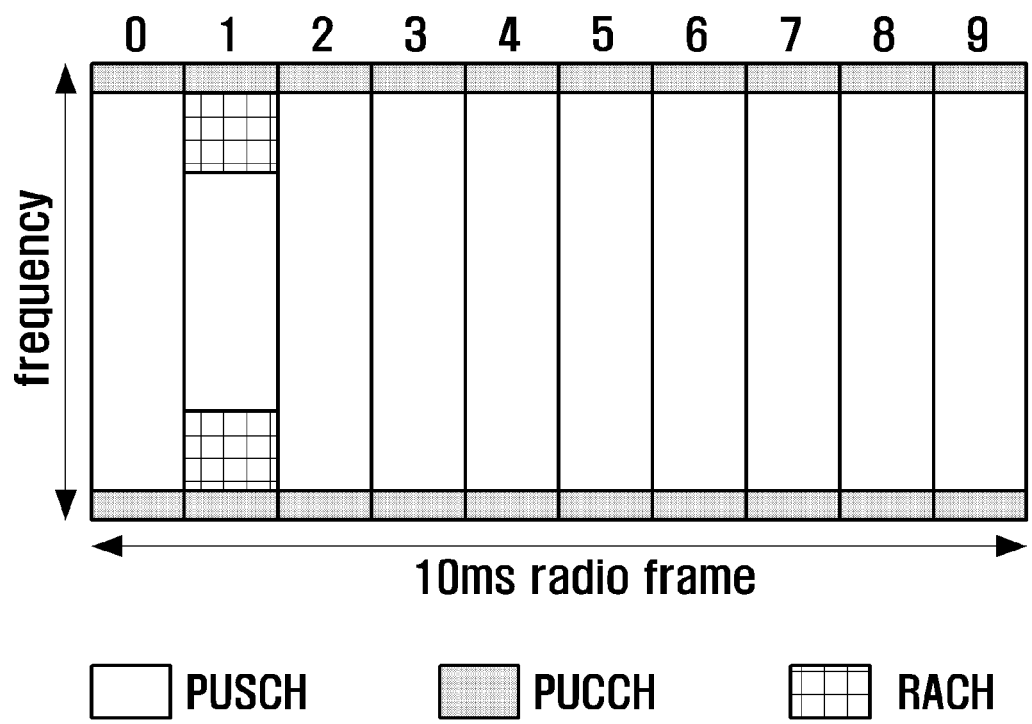
FIG. 3 shows a Random Access CHannel's (RACH's) location in the frequency domain according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to at least one of such surfaces.

Exemplary embodiments of the present invention provide a method for configuring a Random Access CHannel (RACH) in a Long-term Evolution (LTE) Time Division Duplex (TDD) system. More specifically, exemplary embodiments of the present invention provide a method for configuring a random access preamble transmitted through an Uplink Pilot Time Slot (UpPTS). Hereinafter, the random access preamble transmitted through an UpPTS is referred to as a short RACH.

For an LTE TDD system, several RACH resources are configured in one RACH timing location. Here, the RACH resource refers to a time frequency resource with frequency bandwidth of R and time length T. In an LTE system, R=1.08 MHz and T refers to the time interval occupied by the preamble. It is possible for a short RACH, which is transmitted through an UpPTS, to carry a smaller number of preambles. For instance, in the LTE TDD system, 64 preambles are provided by the physical layer to layer 2. If the number of preambles provided by each short RACH resource is less than 64, the physical layer configures a plurality of short RACH resources to obtain the ability to support 64 preambles. In addition, if the load of the RACH in the system is comparatively heavy, a plurality of RACH resources are configured in one RACH timing location even though each RACH resource can provide 64 preambles.

Three methods for configuring the RACH are described below.

Method for Configuring a RACH and a Sensing Reference Signal (SRS)

Similar to the discussion on an LTE Frequency Division Duplex (FDD) system, in order to avoid damaging a Physical Uplink Shared Data Channel's (PUSCH)'s single-carrier attribute, only the frequencies on the two ends of the system frequency band can be allocated as RACH resources for an LTE TDD system. More specifically, there are two situations in the allocation. In one situation, a Physical Uplink Control CHannel (PUCCH) is configured in the two ends of the system frequency band. In this case, the two backup locations for RACH resources are the frequency resource adjacent to the PUCCH. In the other situation, no PUCCH is configured in the two ends of the system frequency band. In this case, the two backup locations for RACH resources are the boundaries of the system frequency band.

Methods for allocating RACH resources in the RACH timing locations are described below.

In the first method, a plurality of RACH resources are distributed in the RACH backup resources at the two ends of the system frequency band as uniformly as possible for one RACH timing location. Suppose that the number of RACH resources to be allocated at some RACH timing location is N, then $$\left\lfloor \frac{N}{2} \right\rfloor \text{ and } \left\lceil \frac{N}{2} \right\rceil$$

RACH resources are respectively allocated at the two ends of the system frequency band. More specifically, if N=1, only one RACH resource is allocated at the RACH timing location and it is located at one end of the system frequency band. If N>1, at the RACH timing location, the RACH resources are distributed at the two ends of the system frequency band as uniformly as possible. This method is applicable to all five formats of the random access preamble listed in Table 1. With this method, RACH resources are uniformly distributed at the two ends of the frequency band so as to be advantageous to frequency hopping resource allocation for the PUSCH. An important frequency hopping method is the mirror image one, wherein the RACH resources are uniformly distributed at the two ends of the frequency band to reduce the constraints on the PUSCH frequency hopping. If the random access preamble is to be transmitted, a User Equipment (UE) selects one occupied RACH resource among the plurality of RACH resources distributed at the two ends of the system frequency band according to the currently configured RACH resource patterns in a Base Station (BS), generates the random access preamble, and then multiplexes the generated preamble on the selected RACH resources for transmission. According to the currently configured RACH resource patterns, the BS extracts the random access preamble from the plurality of RACH resources distributed at the two ends of the system frequency band and then detects the extracted random access preamble.

In the second method, $N_1$ RACH resources are continuously distributed at one end of the system frequency band for one RACH timing location, and $N_2$ RACH resources are continuously distributed in the other end of the system frequency band for the next RACH timing location. Suppose the number of the RACH resources to be allocated at the two continuous RACH timing locations is $N_1$ and $N_2$, respectively, and both of the $N_1$ and $N_2$ are greater than or equal to 1. Here, the frequency domain distance between the RACH resources distributed in the two continuous RACH timing locations can be guaranteed to be maximal so that the probability of successful retransmission of the random access preamble from UE can be improved. If it is necessary to transmit the random access preamble, the UE selects one occupied RACH resource among the plurality of continuous RACH resources at one end of the system frequency band according to the currently configured RACH resource pattern in the BS, occupies the selected RACH resource, generates the random access preamble and then multiplexes the generated preamble on the selected RACH resource for transmission. According to the currently configured RACH resource pattern, the BS extracts the random access preamble among the plurality of continuous RACH resources located at one end of the system frequency band and then detects the extracted random access preamble.

The second method is applicable to all five formats of the random access preamble listed in Table 1. For instance, to allocate RACH resources within the UpPTS with the second method, no constraint is performed on the information transmitted through the frequencies rather than those occupied by RACH resources, i.e., the information can be uplink data, SRS, or uplink control information, and the like. Here, suppose all frequencies in UpPTS except for the one occupied by RACHs are adopted to transmit SRS. With the second method, the rest of the resources in the UpPTS form a continuous subfrequency channel that contains RACHs locate at two ends of the system frequency band, respectively. In this case, if the frequency band occupied by the RACH resource is narrower than or equal to one half of the system frequency band, the rest of the resources in two UpPTSs can cover the entire system bandwidth so that this method supports detection of all channels with different frequencies on the system bandwidth. For the rest of the resources, the narrowband SRS can be transmitted, and if the bandwidth of broadband SRS is less than or equal to one half of the system bandwidth, the rest of the subfrequency bands within two UpPTS can support detection of a broadband channel for the entire system bandwidth. Moreover, if the bandwidth of the frequency band occupied by the RACH resources is greater than one half of the system frequency band, this second method supports detection of a channel with frequencies covering as much of the system bandwidth as possible. The BS transmits the configuration information on SRS to the UE, and the UE transmits SRS via some frequency in the rest of the subfrequency bands according to the configuration information transmitted by the BS.

For the first method mentioned above, if the number of the RACH resources to be allocated for the RACH timing location is more than two, several RACH resources are continuously allocated at one end of the system frequency band. For the second method mentioned above, if the number of the RACH resources to be allocated for the RACH timing location is more than 1, several RACH resources are continuously allocated at one end of the system frequency band. In general, in the method for continuously allocating RACH resources, the adjacent RACH resources occupy adjacent Resource Blocks (RB). Suppose each RACH resource occupies R RBs. In this example, when some RACH resource occupies the k~k+R−1 RBs, the adjacent RACH resource occupies the k−R~k−1 RBs or the k+R~k+2R−1 RBs. If interference between the RACH resources should be reduced, the process of continuously allocating several RACH resources at one end of the system frequency band can be extended to allocate a plurality of RACH resources so that there are m RBs between adjacent RACH resources (m>=0). Here, m=0 corresponds to the case of a method for normal continuous allocation. Suppose some RACH resource occupies the k~k+R−1 RBs, then the adjacent RACH resource occupies the k−R−m~k−1−m RBs or the k+R+m~k+2R−1+m RBs.

The BS can indicate the currently configured RACH resource via the broadcast channel. The system can predefine the configuration patterns for some RACH resource. By indexing the configuration patterns, only the index value is necessary to be transmitted via the broadcast channel.

Figure 4:
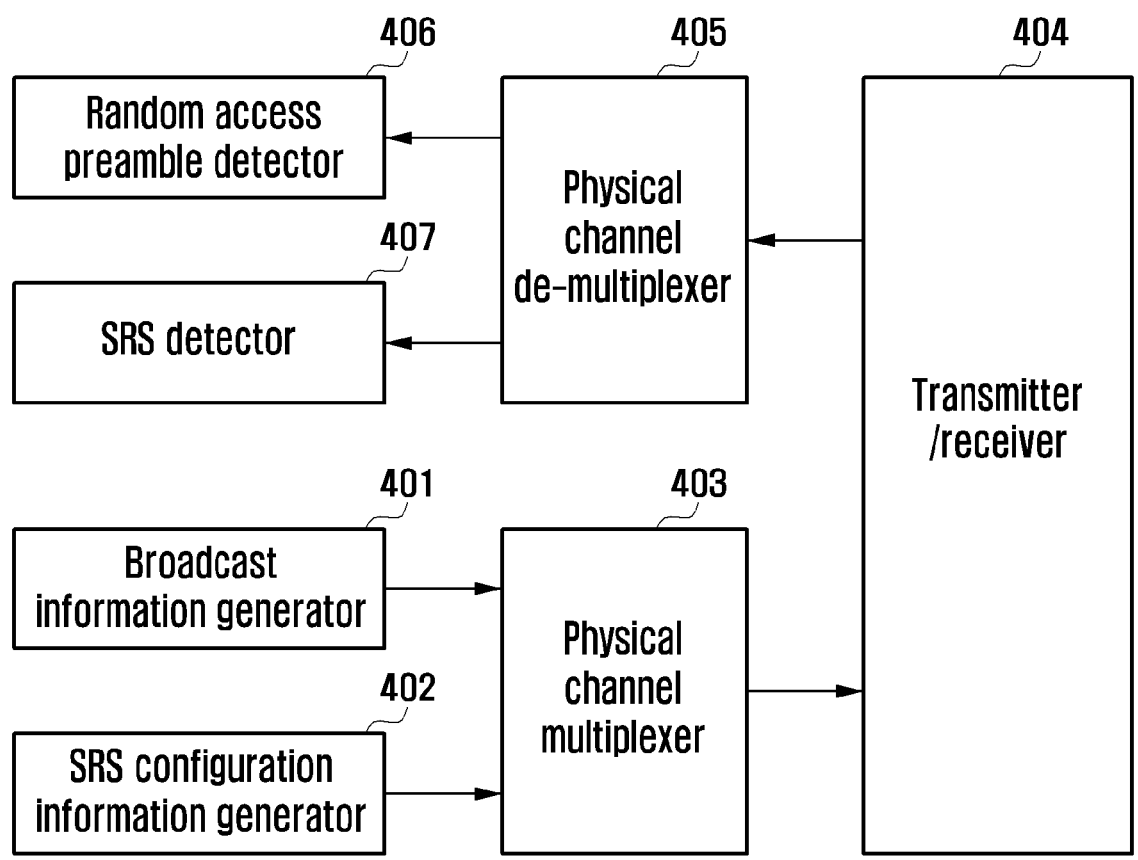
FIG. 4 shows a device in a Base Station (BS) for RACH and Sensing Reference Signal (SRS) processing according to an exemplary embodiment of the present invention.

FIG. 4 shows a device for processing a RACH and a SRS in a BS according to an exemplary embodiment of the present invention.

Referring to FIG. 4, the BS includes a broadcast information generator 401 for generating broadcast information for configuring the RACH and a SRS configuration information generator 402 for generating SRS configuration information. The broadcast information and the SRS configuration information are multiplexed by a physical channel multiplexer 403 to be transmitted through a transmitter/receiver 404. The BS receives a signal from a UE through the transmitter/receiver 404. The received signal is de-multiplexed through a physical channel de-multiplexer 405 according to the method proposed in exemplary embodiments of the present invention. According to a currently configured pattern on RACH resources in the BS, the BS extracts a random access preamble from the plurality of continuous RACH resources located at one end of the system frequency band and detects the extracted random access preamble through a random access preamble detector 406. When the BS configures the frequencies other than those for RACH resources to transmit SRS, the BS extracts the SRS signal from the frequencies other than those for RACH resources and detects the extracted SRS through an SRS detector 407.

Figure 5:
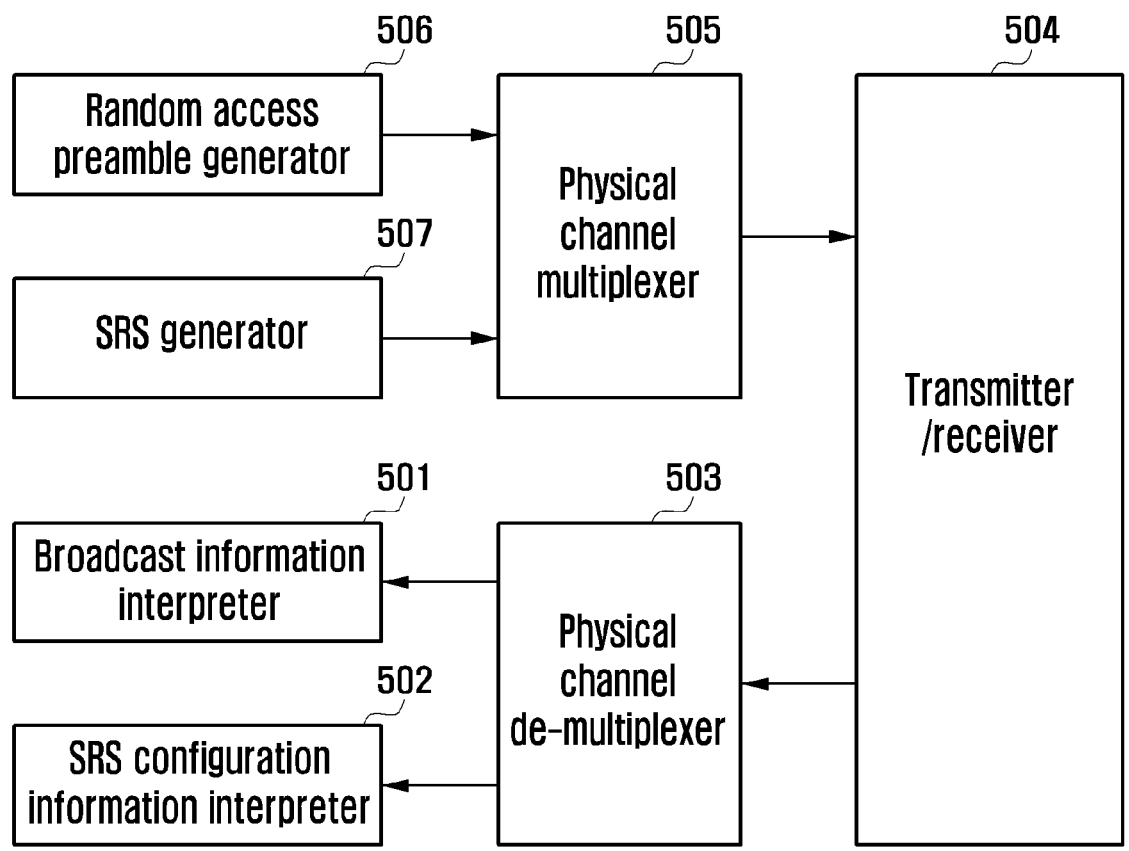
FIG. 5 shows a device in a User Equipment (UE) for RACH and SRS processing according to an exemplary embodiment of the present invention.

FIG. 5 shows a device for processing a RACH and a SRS in a UE according to an exemplary embodiment of the present invention.

Referring to FIG. 5, the UE receives a signal from a BS through a transmitter/receiver 504. The received signal is de-multiplexed through a physical channel de-multiplexer 503 and broadcast information on a RACH configuration is obtained by a Broadcast Information interpreter 501 and SRS configuration information is obtained by a SRS configuration information interpreter 502. If it is necessary to transmit a random access preamble, the UE selects its occupied RACH resources from the plurality of continuous resources at one end of the system frequency band according to a currently configured RACH resource configuration pattern. The random access preamble is generated by a random access preamble generator 506. After being multiplexed by a physical channel multiplexer 505 into the selected RACH resources, the preamble is transmitted through the transmitter/receiver means 504. In a case where the BS configures frequencies other than those for RACH resources to transmit SRS, the UE generates a SRS in SRS generator 507, multiplexes the SRS into the BS's configured frequencies through the physical channel multiplexer 505, and transmits the SRS through the transmitter/receiver 504.

Method for Configuring Multiple RACH Resources in UpPTS

In some configuration cases in an LTE TDD system, the UpPTS contains more than two Single Carrier Frequency Division Multiple Addressing (SCFDMA) symbols. For instance, to be backward compatible with Time Division (TD)-SCDMA, the UpPTS can contain 2, 6, 7, or 11 symbols. In the preamble format 4 in Table 1, the time length is 5120×$T_s$, which is equal to a length of 2.5 SCFDMA symbols. Suppose some short RACHs have been transmitted via the UpPTS, then within the subfrequency band for RACH, the short RACHs only occupy part of the SCFDMA symbols. For example, when the UpPTS contains 6 symbols, three or four SCFDMA symbols within the subfrequency band for the RACH will be idle. A method is described below on how to utilize these remaining time frequency resources, according to an exemplary embodiment of the present invention.

If a plurality of RACH resources are configured in a UpPTS and the UpPTS contains comparatively many symbols, a solution of multiplexing a plurality of RACH resources in the UpPTS in a time division multiplex mode is provided, according to an exemplary embodiment of the present invention. Here, no constraint is declared on whether a BS is allowed to schedule resources occupied by RACHs to a UE for uplink data transmission. If RACH resources should be guaranteed to be orthogonal to other resources (such as an SRS, uplink data, and the like), SCFDMA symbols other than those for RACH in a subfrequency band should be adopted to transmit other information (such as the SRS, uplink data, and the like). For instance, suppose that the time length of a short RACH is T. The time length of the preamble in format 4 in Table 1 for an LTE TDD system is $5120 \times T_s$, which is not an integer time of the length of the number of uplink symbols. The first method for allocating RACH resources in an UpPTS is to continuously allocate a plurality of RACH resources in the subfrequency band for an RACH, i.e., the start sample of a latter RACH resource is the one next to the stop sample of the former RACH resource. For instance, the RACH resources are allocated continuously forward starting from a stop position of a UpPTS, or the RACH resources are allocated continuously backward starting from a start position of the UpPTS, or one RACH resource is allocated starting from stop position of the second SCFDMA symbol in UpPTS, and other RACH resources are allocated continuously backward starting from the sampling position next to the stop sample of the second SCFDMA symbol in UpPTS. The second method for allocating RACH resources in UpPTS is to configure the RACH resources according to the boundaries of corresponding SCFDMA symbols. For instance, each RACH signal begins to be transmitted at a moment that is T prior to the terminating position of its last SCFDMA symbol, or each RACH signal begins to be transmitted at the moment when its first SCFDMA symbol starts.

The method proposed in an exemplary embodiment of the present invention can be jointly used with a method for multiplexing a plurality of RACH resources based on Frequency Division Multiplexing (FDM). In this case, the RACH resources are allocated in several subfrequency bands of a UpPTS and at each subfrequency band, at least one RACH resource is allocated.

A BS can indicate the currently configured RACH resource via the broadcast channel. The system can pre-define some configuration patterns for the RACH resource. By indexing the configuration patterns, only the index value is necessary to be transmitted via the broadcast channel.

Figure 6:
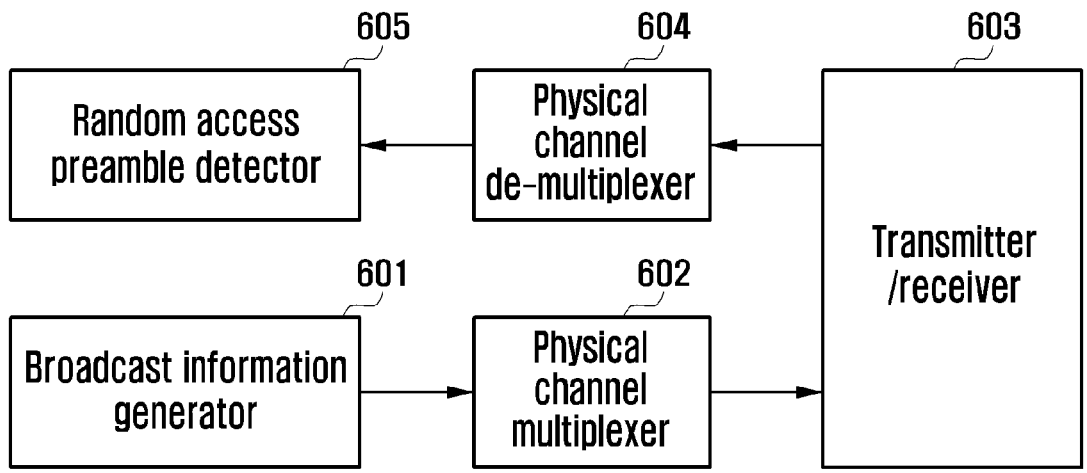
FIG. 6 shows a device in a BS for detecting several time division multiplexed RACHs according to an exemplary embodiment of the present invention.

FIG. 6 shows a device with which a BS detects Time Division Multiplexed (TDM) RACH resources according to an exemplary embodiment of the present invention.

Referring to FIG. 6, the BS includes a broadcast information generator 601 for generating broadcast information for configuring an RACH. The broadcast information is multiplexed by a physical channel multiplexer 602, and transmitted through a transmitter/receiver 603. The BS receives a signal through the transmitter/receiver 603 from a UE. The received signal is de-multiplexed through a physical channel de-multiplexer 604 according to a method proposed in an exemplary embodiment of the present invention. According to the currently configured RACH resource patterns, the BS extracts a random access preamble from the plurality of RACH resources multiplexed in a time division mode and detects the extracted random access preamble through a random access preamble detector 605.

Figure 7:
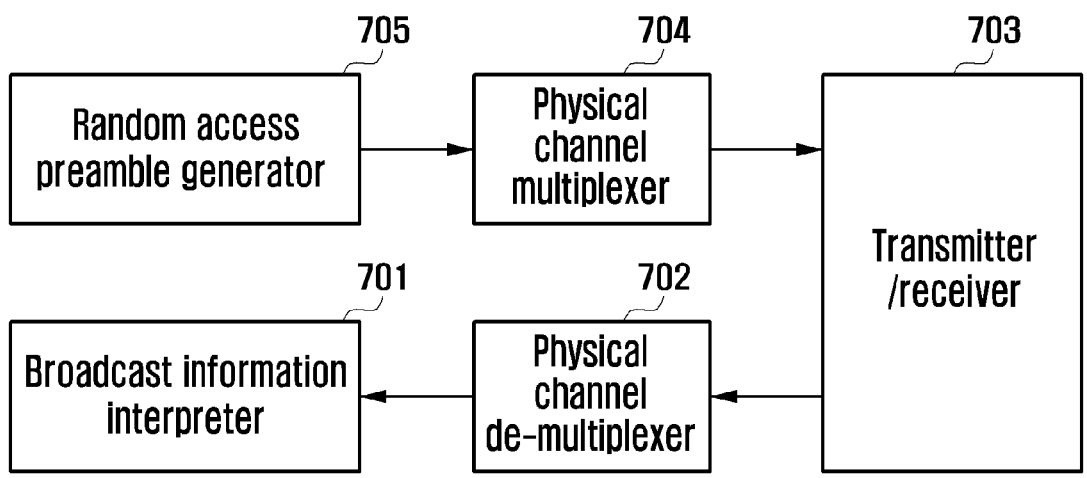
FIG. 7 shows a device in a UE for transmitting several time division multiplexed RACHs according to an exemplary embodiment of the present invention.

FIG. 7 shows a device with which a UE transmits TDM RACH resources according to an exemplary embodiment of the present invention.

Referring to FIG. 7, the UE receives a signal from a BS through a transmitter/receiver 703. The received signal is de-multiplexed through a physical channel de-multiplexer 702 and a broadcast information interpreter 701 obtains broadcast information for configuring RACH. If it is necessary to transmit a random access preamble, a UE selects its occupied RACH resources among the plurality of TDM RACH resources according to currently configured RACH resource pattern and generates a random access preamble in a random access preamble generator 705. After being mul-tiplexed by a physical channel multiplexer 704 into the selected RACH resources, the preamble is transmitted through the transmitter/receiver 703.

Structure of RACH Added with Cyclic Prefix (CP)

In format 4 of the random access preamble listed in Table 1, a length of a CP is zero. To support the processing in the frequency domain, a method based on overlap & add is adopted by a BS for receiving the random access preamble. Configuring a general CP frame structure is taken as an example to describe a typical configuration of a UpPTS when the UpPTS contains two SCFDMA symbols. Suppose the symbol division and CP length setting within the 1 ms period formed by the three special domains in the TDD system are substantially the same as that in other subframes in a TDD system, the UpPTS is $4384 \times T_s$ long in the time domain. In format 4, the preamble begins to transmit at a moment that is $5120 \times T_s$ prior to the termination of the UpPTS. In this way, a RACH signal in the preamble format 4 occupies part of a Guard Period (GP). Therefore, interference may easily be encountered from an adjacent BS's downlink signal when the RACH signal is transmitted in preamble format 4. In more detail, since the RACH's initial timing is prior to the position of the first symbol in the UpPTS, the RACH signal may have encountered interference before any other signals transmitted through the frequencies other than those for the RACHs in the UpPTS that encountered interference caused by the adjacent BS.

A method is described below for configuring the short RACH to address the interference problem mentioned above, according to an exemplary embodiment of the present invention. One technique is to add a CP into a RACH signal, and the structures which are similar to the preamble formats 0~3 in table 1 are utilized. To guarantee that RACH signal's anti-interference performance is not less than that of other signals transmitted through frequencies other than those for RACH signals in UpPTS, an exemplary embodiment of the present invention provides that the starting position of a Discrete Fourier Transform (DFT) window with which a BS detects the random access preamble is not earlier than the start position of the first valid SCFDMA symbols starts in the UpPTS. Here, the start position of the valid SCFDMA symbol refers to the timing of the first SCFDMA sample without considering the CP. Suppose the length of the CP in the first symbol of the UpPTS is $C \times T_s$, then the starting position of the DFT window with which the BS detects the random access preamble should be delayed at least $C \times T_s$ later than UpPTS's initial timing Taking the LTE TDD system as an example and supposing that the symbol division and CP length setting within the 1 ms period formed by the three special domains are substantially the same as that in other subframes, then according to a present LTE TDD subframe structure, C=160 when UpPTS contains 7 symbols, and otherwise, C=144.

The time lengths of a CP and a RACH signal's valid sequence can be determined according to such factors as the supported cell coverage, and the like. When it is necessary to maintain the design parameters for the preamble format 4, as shown in Table 2, one configuration method is to set the time length of the RACH signal's valid sequence as $T_p=4096 \times T_s$ so as to be in accordance with the sequence length of the RACH signal in the preamble format 4. Suppose the RACH signals of an exemplary embodiment of the present invention begin to be transmitted at the moment that is T prior to UpPTS's termination position. For instance, we can configure $T=x5120T_s$ in the same mode for configuring the RACH signal in the preamble format 4. The starting position of the DFT window for the BS detecting the random access preamble starts from the first valid SCFDMA symbol in UpPTS. In this case, the length of a CP in the RACH signal in an exemplary embodiment of present invention is $T_{CP}=T-T_p-t_{cp}$, where $t_{cp}$ denotes the length of the CP in the last symbol of a UpPTS. For a general CP frame structure, $t_{cp}=144\times T_s$ and the length of CP is $880\times T_s$.

TABLE 2

Format of preamble with added CP

| Preamble format | $T_{CP}$ | $T_{SEQ}$ |
|---|---|---|
| x (only applied to Frame Structure Type 2) | $880 \times T_s$ | $4096 \times T_s$ |

With this method, it is possible that the RACH preamble still occupies part of the GP. However, the signal during such period is not utilized by a BS when detecting the random access preamble. Also, with this method, the mitigation of interference caused by adjacent BSs is improved. With this method, when the start position of the DFT window with which a BS detects the random access preamble is the start position of the first valid SCFDMA symbol in a UpPTS, the RACH signal experiences no interference until any other signals transmitted through the UpPTS suffer from interference. When the start position of the DFT window with which BS detects the random access preamble is latter than the start position of the first valid SCFDMA symbol in the UpPTS, the RACH signals begin to be interference only after any other signals transmitted through the UpPTS have suffered certain interference.

EXEMPLARY TECHNIQUES

In this section, four exemplary techniques are provided. To avoid too tedious a description of the four exemplary techniques, details of well-known functions or means are omitted.

First Exemplary Technique

A first exemplary technique to configure a plurality of RACH resources and a SRS in the UpPTS is described below. Consider a system with a bandwidth of 5 MHz as an example and suppose the UpPTS contains two SCFDMA symbols and there is no transmission of a PUCCH. Also, suppose that two RACH resources are transmitted in an FDM mode in an UpPTS, and the rest of the resources in the UpPTS are adopted to transmit a SRS. Since the 5 MHz system contains 25 RBs and a bandwidth of each RACH resource occupies 6 RBs, only 13 other RBs exist in the UpPTS except for the resources occupied by the RACH.

Figure 8:
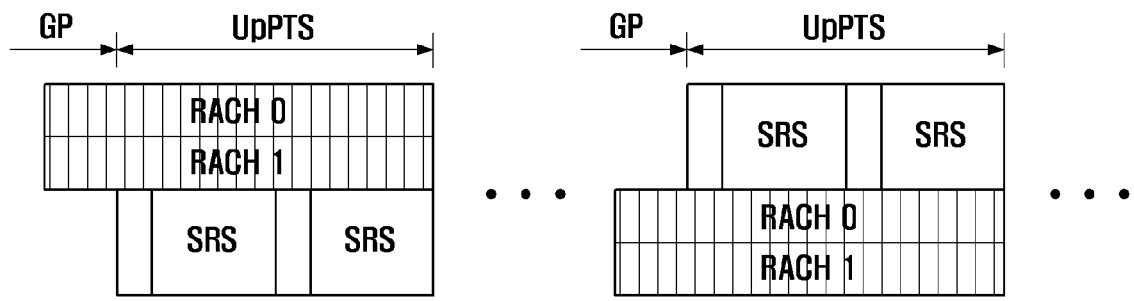
FIG. 8 illustrates a method for configuring a RACH and a SRS according to an exemplary embodiment of the present invention.

FIG. 8 illustrates a method for configuring a RACH and a SRS according to an exemplary embodiment of the present invention.

Referring to FIG. 8, in the first UpPTS, two RACH resources are continuously allocated from the upper end of the system frequency band, which occupies 12 RBs, and the remaining 13 RBs in the system bandwidth are adopted to transmit a SRS. In the second UpPTS, two RACH resources are continuously allocated from the lower end of the system frequency band which occupies 12 RBs, and the remaining 13 RBs in the system bandwidth are adopted to transmit SRS. As shown in FIG. 8, the RACH resources in the second UpPTS are located respectively at the two ends of the system frequency band and can obtain superior frequency diversity effect. Meanwhile, the SRS in the second UpPTS covers the entire system frequency band so that the measurement of a channel state over the entire system band is well supported. More particularly, this structure can support the transmission of such narrowband SRSs as occupying a bandwidth of 4 RBs or 6 RBs. Also, this structure can support the transmission of such narrowband SRSs as occupying a width of 12 RBs or 13 RBs, i.e., about half of the system bandwidth.

Second Exemplary Technique

A second exemplary technique for configuring a plurality of RACH resources in the preamble format 0 is described below for an LTE TDD system. Suppose the RACH channels are allocated in subframe 2 (or subframe 5). Meanwhile, this subframe is adopted to transmit a PUCCH. Further suppose that one subframe is to transmit two RACH resources. To extend the time length of the RACH resource to a plurality of subframes, this technique is also suitable for configuring the RACH resources in the preamble formats 1~3.

Figure 9:
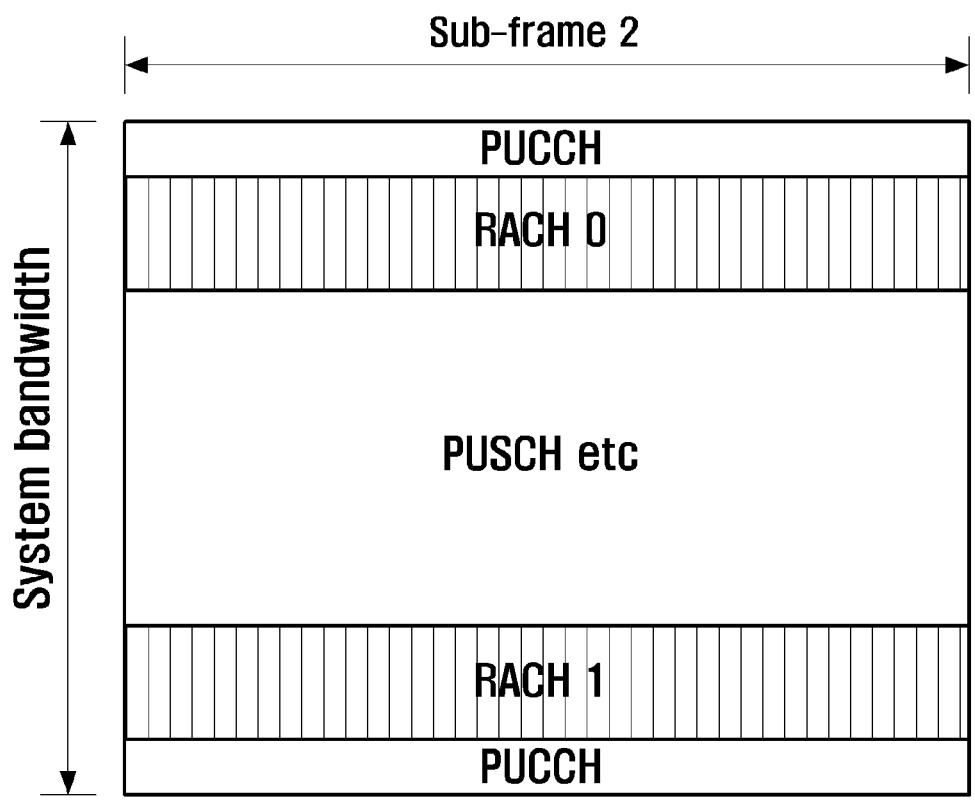
FIG. 9 illustrates a method for configuring a RACH according to an exemplary embodiment of the present invention.

FIG. 9 illustrates a method for configuring a RACH according to an exemplary embodiment of the present invention.

Referring to FIG. 9, at least one RB at the two ends of the system frequency band is adopted to transmit a PUCCH. The two RACH resources locate in the two ends of the system band respectively and occupy the RBs adjacent to those for the PUCCH. Suppose that the PUCCH occupies k RBs, and the system bandwidth contains N RBs. If the RBs are indexed from 0, then k~k+5 RBs are adopted to transmit one RACH resource, and the N−k−6~N−k−1 RBs are adopted to transmit the other RACH resource. In this way, the mirror image relationship exists between the two RACH resources with respect to the center of the system bandwidth. Accordingly, the allocation of resources for a frequency hopping PUSCH with the mirror image is not affected.

Third Exemplary Technique

A third exemplary technique for configuring a plurality of RACH resources in a UpPTS in a TDM mode is described below. Suppose the UpPTS contains 6 SCFDMA symbols and the two RACH resources can be accordingly multiplexed together in the TDM mode. T denotes the length of time occupied by each RACH resource. For instance, the length of time occupied by the RACH resource in the preamble format 4 in Table 1 is $T=5120\times T_s$.

Figure 10:
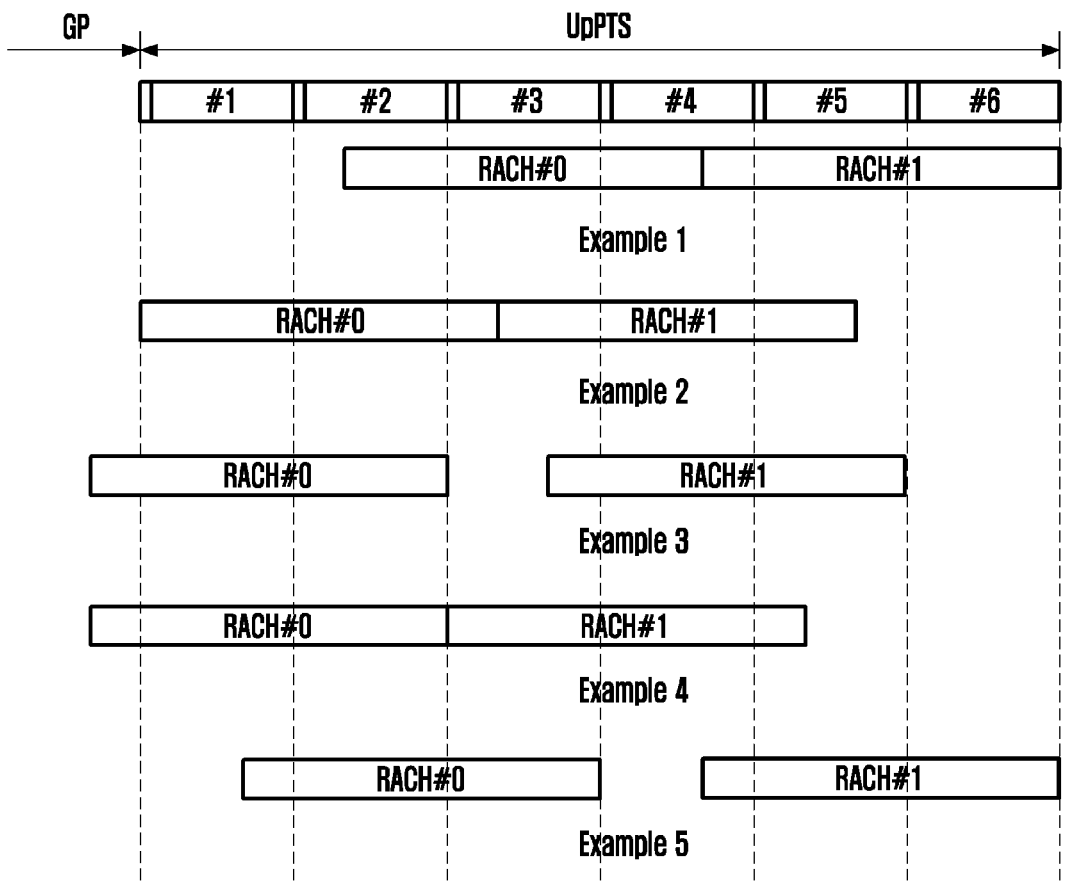
FIG. 10 illustrates a method for configuring a RACH in time division multiplex mode according to an exemplary embodiment of the present invention.

FIG. 10 illustrates a method for configuring a RACH in time division multiplex mode according to an exemplary embodiment of the present invention. In order to highlight the third exemplary technique for TDM RACH resources, no illustration is done to the usage of frequencies other than those for the RACHs in the UpPTS.

Referring to FIG. 10, in a first example, the two RACH resources are continuously allocated starting from the termination position of the UpPTS. In other words, the system begins to transmit RACH#1 at the moment that is T prior to the termination position of UpPTS, and the system begins to transmit RACH#0 at the moment that is 2T prior to the termination position of UpPTS. Here, the first SCFDMA symbol in the UpPTS is not occupied by the RACH and therefore, the first SCFDMA symbol can be adopted to transmit SRS or uplink data, and the like.

In a second example, the two RACH resources are continuously allocated starting from the start position of the UpPTS. In other words, the system begins to transmit RACH#0 at the moment of the start position of UpPTS, and the system begins to transmit RACH#1 at the moment that is delayed T behind the start position of UpPTS. Here, the last SCFDMA symbol in the UpPTS is not occupied by the RACH and therefore can be adopted to transmit a SRS or uplink data, and the like.

In a third example, the two RACH resources are allocated starting from the stop position of SCFDMA symbol. In other words, the system begins to transmit RACH#0 at the moment that is T prior to the stop position of the second SCFDMA symbol in UpPTS, and the system begins to transmit RACH#1 at the moment that is T prior to the stop position of the fifth SCFDMA symbol in UpPTS. Here, the last SCFDMA symbol in the UpPTS is not occupied by the RACH and therefore can be adopted to transmit SRS or uplink data, and the like.

In a fourth example, the two RACH resources are continuously allocated. In other words, the system begins to transmit RACH#0 at the moment that is T prior to the stop position of the second SCFDMA symbol in UpPTS, and the system begins to transmit RACH#1 at the moment of the sample position next to the second SCFDMA symbol in the UpPTS. Here, the last SCFDMA symbol in the UpPTS is not occupied by the RACH and therefore can be adopted to transmit a SRS or uplink data, and the like.

In a fifth example, the two RACH resources are allocated both starting from the stop positions of the SCFDMA symbols. In other words, the system begins to transmit RACH#0 at the moment that is T prior to the stop position of the third SCFDMA symbol in UpPTS, and the system begins to transmit RACH#1 at the moment that is T prior to the stop position of the sixth SCFDMA symbol in UpPTS.

Fourth Exemplary Technique

A fourth exemplary technique implementing a short RACH with an added CP is described below. Suppose the UpPTS contains two SCFDMA symbols and the new short RACH structure is the same as the preamble format 4, i.e., the system begins to transmit RACH at the moment that is $5120 \times T_s$ prior to the termination position of UpPTS.

Figure 11:
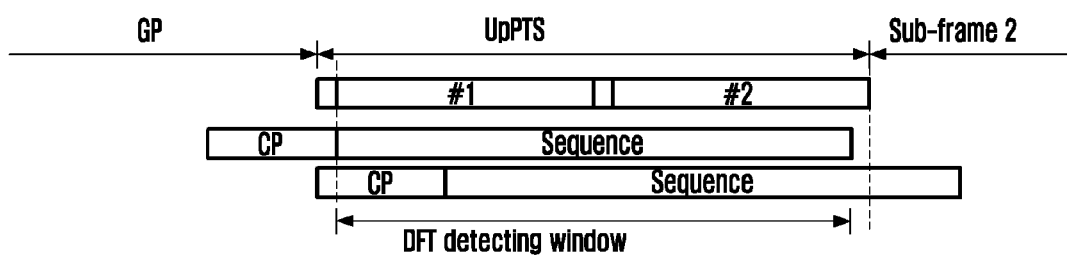
FIG. 11 shows a structure of a short RACH with a Cyclic Prefix (CP) according to an exemplary embodiment of the present invention.

FIG. 11 shows a structure of a short RACH with a CP according to an exemplary embodiment of the present invention.

Referring to FIG. 11 a configuration on the preamble with a CP is illustrated. With the preamble parameters in Table 2, the time length of a RACH signal's sequence is $4096 \times T_s$, and the length of a CP is $880 \times T_s$ The start position of the DFT with which a BS detects a random access preamble is the start position of the first valid SCFDMA symbol in a UpPTS. With this technique, it is possible that the RACH preamble still occupies part of the GP. However, since the signals within this period are not utilized by the BS in the random access preamble detecting, the mitigation of interference caused by adjacent BSs is improved. The RACH signal experiences substantially no interference before any other signals transmitted through UpPTS suffer from interference. With this configuration method, it is possible that the RACH signal causes interference to the first SCFDMA symbol of subframe 2 (or subframe 6). But this interference level is very low.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A base station for allocating a random access channel (RACH) resource in a wireless communication system employing time division duplex (TDD) mode, the base station comprising:
    a generator configured to:
        generate RACH resource allocation information to allocate the RACH resource in an uplink pilot time slot (UpPTS); and
    a transceiver configured to:
        transmit, to a terminal, the RACH resource allocation information, and
        receive, from the terminal, a random access preamble in the UpPTS,
    wherein the generator further configures first resource blocks in a first time and second resource blocks in a second time,
    wherein the first resource blocks of the RACH resource and the second resource blocks of the RACH resource are configured to different frequency bands, and
    wherein the first resource blocks and the second resource blocks are determined based on a RACH resource frequency index.

2. The base station of claim 1,
    wherein the RACH resource is allocated based on a first offset in the first time, and
    wherein the RACH resource is allocated based on a second offset in the second time.

3. The base station of claim 1, wherein the RACH resource occupies a bandwidth corresponding to 6 consecutive resource blocks.

4. The base station of claim 1, wherein a format for a first random access preamble and a second random access preamble transmitted in the UpPTS is 4.

5. The base station of claim 1,
    wherein the generator is further configured to generate sounding reference signal (SRS) configuration information, and
    wherein the transceiver is further configured to transmit, to the terminal, the SRS configuration information.

6. The base station of claim 5,
    wherein the transceiver is further configured to receive, from the terminal, an SRS using an SRS resource based on the SRS configuration information,
    wherein the RACH resource does not overlap with the SRS resource in the UpPTS.

7. A terminal for receiving a random access channel (RACH) resource in a wireless communication system employing time division duplex (TDD) mode, the terminal comprising:
    a generator configured to generate a random access preamble; and
    a transceiver configured to:
        receive, from a base station, RACH resource allocation information allocating the RACH resource in an uplink pilot time slot (UpPTS), and
        transmit, to the base station, the random access preamble in the UpPTS,
    wherein first resource blocks of the RACH resource are configured in a first time and second resource blocks of the RACH resource are configured in a second time,
    wherein the first resource blocks and the second resource blocks are configured to different frequency bands, and
    wherein the first resource blocks and the second resource blocks are determined based on a RACH resource frequency index.

8. The terminal of claim 7, wherein the RACH resource is allocated based on a first offset in the first time, and the RACH resource is allocated based on a second offset in the second time.

9. The terminal of claim 7, wherein the RACH resource occupies a bandwidth corresponding to 6 consecutive resource blocks.

10. The terminal of claim 7, wherein a format for a first random access preamble and a second random access preamble transmitted in the UpPTS is 4.

11. The terminal of claim 7,
wherein the generator is further configured to generate a sounding reference signal (SRS),
wherein the transceiver is further configured to:
receive, from the base station, sounding reference signal (SRS) configuration information, and
transmit, to the base station, the SRS using an SRS resource based on the SRS configuration information, and
wherein the RACH resource does not overlap with the SRS resource in the UpPTS.

12. A method for allocating a random access channel (RACH) resource by a base station in a wireless communication system employing time division duplex (TDD) mode, the method comprising:
generating RACH resource allocation information to allocate the RACH resource in an uplink pilot time slot (UpPTS);
transmitting, to a terminal, the RACH resource allocation information; and
receiving, from the terminal, a random access preamble in the UpPTS,
wherein first resource blocks of the RACH resource are configured in a first time and second resource blocks of the RACH resource are configured in a second time,
wherein the first resource blocks and the second resource blocks are configured to different frequency bands, and
wherein the first resource blocks and the second resource blocks are determined based on a RACH resource frequency index.

13. The method of claim 12, wherein the RACH resource is allocated based on a first offset in the first time, and the RACH resource is allocated based on a second offset in the second time.

14. The method of claim 12, wherein the RACH resource occupies a bandwidth corresponding to 6 consecutive resource blocks.

15. The method of claim 12, wherein a format for a first random access preamble and a second random access preamble transmitted in the UpPTS is 4.

16. The method of claim 12, further comprising:
generating sounding reference signal (SRS) configuration information; and
transmitting, to the terminal, the SRS configuration information.

17. The method of claim 16, further comprising:
receiving, from the terminal, an SRS using an SRS resource based on the SRS configuration information,
wherein the RACH resource does not overlap with the SRS resource in the UpPTS.

18. A method for receiving a random access channel (RACH) resource by a terminal in a wireless communication system employing time division duplex (TDD) mode, the method comprising:
receiving, from a base station, RACH resource allocation information allocating the RACH resource in an uplink pilot time slot (UpPTS); and
transmitting, to the base station, a random access preamble in the UpPTS,
wherein first resource blocks of the RACH resource are configured in a first time and second resource blocks of the RACH resource are configured in a second time,
wherein the first resource blocks and the second resource blocks are configured to different frequency bands, and
wherein the first resource blocks and the second resource blocks are determined based on a RACH resource frequency index.

19. The method of claim 18, wherein the RACH resource is allocated based on a first offset in the first time, and the RACH resource is allocated based on a second offset in the second time.

20. The method of claim 18, wherein the RACH resource occupies a bandwidth corresponding to 6 consecutive resource blocks.

21. The method of claim 18, wherein a format for a first random access preamble and a second random access preamble transmitted in the UpPTS is 4.

22. The method of claim 18, further comprising:
receiving, from the base station, sounding reference signal (SRS) configuration information;
generating an SRS; and
transmitting, to the base station, the SRS based on the SRS configuration information,
wherein the RACH resource does not overlap with the SRS resource in the UpPTS.

* * * * *